United States Patent
Nakayama et al.

(10) Patent No.: US 10,442,913 B2
(45) Date of Patent: Oct. 15, 2019

(54) RESIN COMPOSITION AND RESIN MOLDED ARTICLE

(71) Applicant: FUJI XEROX CO., LTD., Tokyo (JP)

(72) Inventors: Daisuke Nakayama, Kanagawa (JP);
Tsuyoshi Miyamoto, Kanagawa (JP);
Masayuki Okoshi, Kanagawa (JP);
Hiroyuki Moriya, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 43 days.

(21) Appl. No.: 15/784,490

(22) Filed: Oct. 16, 2017

(65) Prior Publication Data
US 2018/0171100 A1 Jun. 21, 2018

(30) Foreign Application Priority Data
Dec. 21, 2016 (JP) .................. 2016-248099

(51) Int. Cl.
| | |
|---|---|
| *C08L 77/04* | (2006.01) |
| *C08K 7/02* | (2006.01) |
| *C08K 3/04* | (2006.01) |
| *C08L 23/12* | (2006.01) |
| *C08L 77/06* | (2006.01) |
| *C08G 69/08* | (2006.01) |

(52) U.S. Cl.
CPC ............ *C08K 3/042* (2017.05); *C08K 7/02* (2013.01); *C08L 23/12* (2013.01); *C08L 77/04* (2013.01); *C08L 77/06* (2013.01); *C08G 69/08* (2013.01)

(58) Field of Classification Search
CPC .............. C08K 3/04; C08K 7/02; C08L 77/04
USPC ............................................. 524/496
See application file for complete search history.

(56) References Cited

U.S. PATENT DOCUMENTS
| | | | |
|---|---|---|---|
| 2003/0092814 A1 | 5/2003 | Borgner et al. | |
| 2012/0028062 A1* | 2/2012 | Elia ................ | B29C 45/14786 428/474.7 |
| 2018/0162069 A1* | 6/2018 | Matsumoto ........... | B29C 43/20 |

FOREIGN PATENT DOCUMENTS
| | | |
|---|---|---|
| JP | 2000-071245 A | 3/2000 |
| JP | 2003-528956 A | 9/2003 |
| JP | 2014-181307 A | 9/2014 |

* cited by examiner

*Primary Examiner* — Deve E Valdez
(74) *Attorney, Agent, or Firm* — Oliff PLC

(57) ABSTRACT

A resin composition includes a thermoplastic resin, a carbon fiber, a polyamide having at least one of a carboxy group and an amino group at a terminal thereof, in which a presence ratio of the carboxy group present on the terminal is higher than a presence ratio of the amino group present on the terminal, and a compatibilizer.

18 Claims, 2 Drawing Sheets

RESIN COMPOSITION AND RESIN MOLDED ARTICLE

CROSS-REFERENCE TO RELATED APPLICATIONS

This application is based on and claims priority under 35 USC 119 from Japanese Patent Application No. 2016-248099 filed Dec. 21, 2016.

BACKGROUND

1. Technical Field

The present invention relates to a resin composition and a resin molded article.

2. Related Art

In the related art, various resin compositions are provided and are used for various applications.

In particular, resin compositions containing a thermoplastic resin are used in various components and housings of home electronics and automobiles or are used in various components such as housings of business machines and electric and electronic apparatuses.

SUMMARY

According to an aspect of the invention, there is provided a resin composition including:
 a thermoplastic resin;
 a carbon fiber;
 a polyamide having at least one of a carboxy group and an amino group at a terminal thereof, in which a presence ratio of the carboxy group present on the terminal (terminal carboxy group) is higher than a presence ratio of the amino group present the terminal (terminal amino group); and
 a compatibilizer.

BRIEF DESCRIPTION OF THE DRAWINGS

Exemplary embodiments of the present invention will be described in detail based on the following figures, wherein.

DETAILED DESCRIPTION

Figure 1:
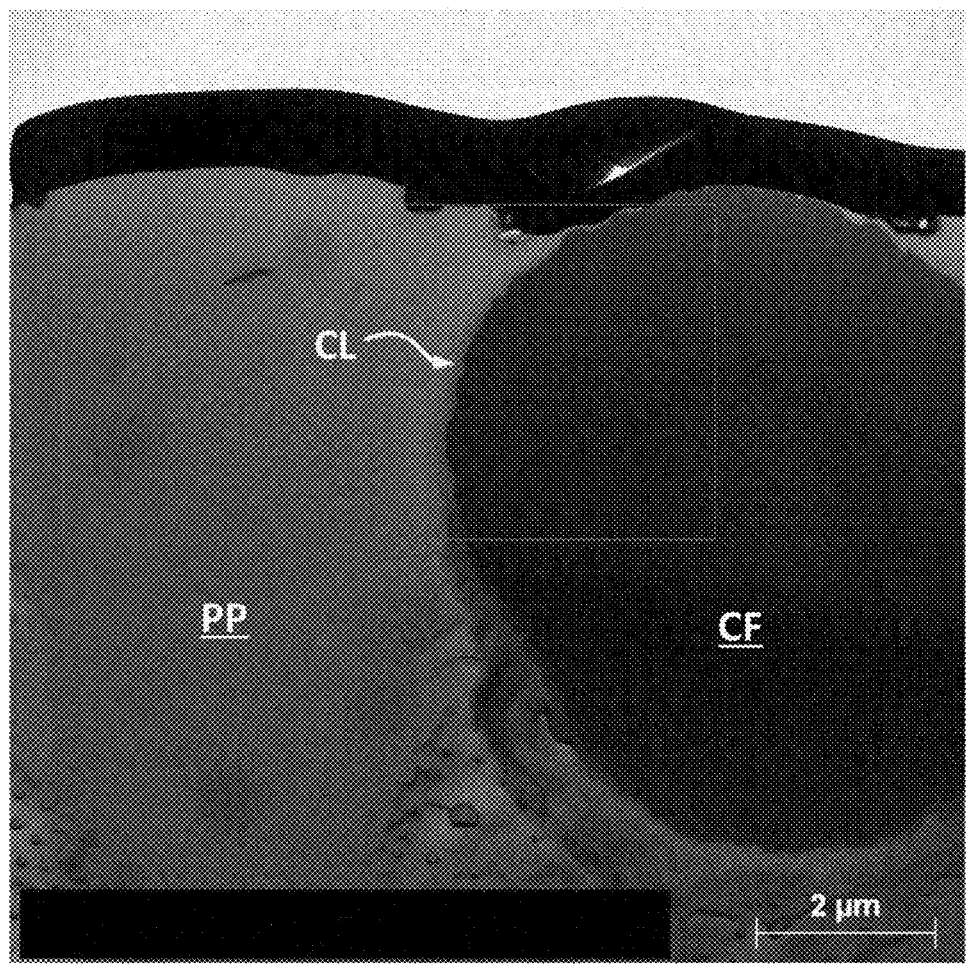
FIG. 1 is a model diagram showing major parts of a resin molded article according to an exemplary embodiment.

Hereinafter, an exemplary embodiment which is an example of a resin composition and a resin molded article according to an exemplary embodiment of the invention will be described.

Resin Composition

The resin composition according to the exemplary embodiment includes a thermoplastic resin, a carbon fiber, a polyamide, and a compatibilizer.

In recent years, in order to obtain a resin molded article superior in mechanical strength, particularly bending elastic modulus, a resin composition containing a thermoplastic resin as a matrix and a reinforcing fiber has been used.

In the resin composition, when affinity between the reinforcing fiber and the thermoplastic resin is low, a space is formed at an interface therebetween, and adhesion at the interface may deteriorate.

In particular, in a case where a carbon fiber is used as the reinforcing fiber in the resin composition, it is required to have higher mechanical strength, particularly bending elastic modulus than that of glass fiber. However, since the number of the polar group contributing to adhesion to the thermoplastic resin such as hydroxyl group and carboxy group on the surface of the carbon fiber is smaller than that of the polar group of the glass fiber, the adhesion at the interface between the carbon fiber and the thermoplastic resin deteriorates. As a result, the mechanical strength, particularly the bending elastic modulus is unlikely enhanced in spite of the formulation of carbon fibers. In particular, in a case where impact is applied repeatedly, flaking easily proceeds at the interface between the carbon fiber and the thermoplastic resin, so that the mechanical strength, particularly bending elastic modulus tends to be largely deteriorated.

Therefore, the resin composition according to the exemplary embodiment includes four components: the thermoplastic resin, the polyamide, the carbon fiber, and the compatibilizer.

By adopting this configuration, for example, a resin molded article superior in mechanical strength, particularly bending elastic modulus may be obtained as compared with a case where only a thermoplastic resin and carbon fiber are contained.

Here, when forming the resin molded article, for example, fluidity of the resin composition may be low in some cases since a viscosity of a thermally melted resin composition is too high. In a case where the fluidity of the thermally melted resin composition is low, moldability of the resin composition is lowered, for example, the accuracy of the shape of the intended resin molded article is lowered, and the dimensional accuracy of the resin molded article may be lowered in some cases.

On the other hand, the resin composition according to the exemplary embodiment contains at least one of a carboxy group and an amino group at a terminal as the polyamide, in addition to the above four components, and a resin having a higher presence ratio of the terminal carboxy group than that of the terminal amino group is applied. That is, the polyamide is a resin having at least one of a carboxy group and an amino group at the terminal, and having a higher ratio of the carboxy group than that of the amino group with respect to the carboxy group or the amino group that may exist at both terminals. The polyamide having a higher presence ratio of the terminal carboxy group than that of the terminal amino group may have the carboxy groups at both terminals.

In the present specification, the terminal amino group refers to an amino group present at the terminal of the polyamide, and the terminal carboxy group refers to the carboxy group present at the terminal of the polyamide.

By adopting this configuration, a resin composition superior in fluidity may be obtained. By molding using the resin composition superior in fluidity, a resin molded article superior in dimensional accuracy may be obtained. Although the action of obtaining such an effect is not clear, it is presumed as follows.

Since the polyamide has a high presence ratio of the terminal carboxy group, the polyamide is likely to be decomposed by heating and the molecular weight is likely to decrease. As a result, it is considered that since the viscosity of the resin composition when heated and melted decreases, the fluidity of the resin composition when forming the resin molded article is enhanced. By molding using a resin composition with enhanced fluidity, it is considered that the resin molded article superior in dimensional accuracy may be obtained since the resin composition is likely to be filled in the mold.

From the above, with respect to the resin composition according to the exemplary embodiment, it is presumed that since the ratio of the carboxy group present at the terminal of the polyamide is high, the viscosity of the resin composition when heated and melted decreases and the fluidity is improved. In addition, it is presumed that the resin molded article superior in dimensional accuracy may be obtained by using the resin composition superior in fluidity.

When the resin composition according to the exemplary embodiment includes the above four components, the resultant molded article is superior in mechanical strength, particularly bending elastic modulus, as compared with, for example, a case where only the thermoplastic resin and the carbon fiber are included. Although the action of obtaining such an effect is not clear, it is considered as follows.

When the resin composition is thermally molten-kneaded in order to obtain the resin molded article from the resin composition according to the exemplary embodiment, the thermoplastic resin as the matrix and the compatibilizer are melted, and a part of the molecules of the compatibilizer and the amide bond contained in the molecules of the polyamide are compatibilized. As a result, the polyamide is dispersed in the resin composition.

In this state, when the polyamide contacts the carbon fiber, the amide bond contained in a large number along the molecular chain of the polyamide and a polar group slightly present on a surface of the carbon fiber are physically bonded to each other through affinity (attraction and hydrogen bond) at plural sites. In addition, generally, the compatibility between the thermoplastic resin and the polyamide is low. Therefore, due to repulsion between the thermoplastic resin and the polyamide, the contact frequency between the polyamide and the carbon fiber increases. As a result, the amount or area of the polyamide bonded to the carbon fiber increases. In this manner, using the polyamide, the coating layer is formed around the carbon fiber (refer to FIG. 1). In FIG. 1, PP represents the thermoplastic resin, CF represents the carbon fiber, and CL represents the coating layer.

Since the polyamide forming the coating layer is also compatible by performing the chemical reaction with a part of the reactive groups in the molecule of the compatibilizer and electrostatic interaction between the polar groups, the compatibilizer is compatible with the thermoplastic resin. Therefore, an equilibrium state is formed between attraction and repulsion, and the coating layer of the polyamide is formed in a thin and substantially uniform state. In particular, the affinity between a carboxy group present on a surface of the carbon fiber and the amide bond contained in the molecules of the polyamide is high. Therefore, it is presumed that the coating layer is easily formed around the carbon fiber using the polyamide, and the coating layer is thin and has superior uniformity.

The coating layer preferably coats the entire circumference of the carbon fiber, while there may be a portion which is not partially coated.

As described above, in the resin composition according to the exemplary embodiment, the adhesion of the interface between the carbon fiber and the thermoplastic resin is enhanced. As a result, it is considered that the resin molded article obtained from the resin composition according to the exemplary embodiment is superior in mechanical strength, particularly bending elastic modulus, as compared with, for example, a case where only the thermoplastic resin and carbon fiber are included.

The resin composition according to the exemplary embodiment and the resin molded article obtained may have a structure in which a coating layer of a polyamide is formed around the carbon fiber by heat molten-kneading and injection molding for preparing of the resin composition (for example, pellet), and the thickness of the coating layer is from 5 nm to 700 nm.

In the resin composition according to the exemplary embodiment, the thickness of the coating layer of the polyamide may be from 5 nm to 700 nm, and is preferably from 10 nm to 650 nm from the viewpoint of further improving the bending elastic modulus. When the thickness of the coating layer is set to 5 nm or more (especially 10 nm or more), the bending elastic modulus is improved. When the thickness of the coating layer is set to 700 nm or less, the interface between the carbon fiber and the thermoplastic resin via the coating layer is prevented from being weakened, and the deterioration in the bending elastic modulus is prevented.

The thickness of the coating layer is a value measured using the following method. A measurement target is cut in liquid nitrogen, and a cross-section thereof is observed using an electron microscope (VE-9800, manufactured by Keyence Corporation). In the cross-section, the thickness of the coating layer which is formed around the carbon fiber is measured at 100 positions, and the average value thereof is obtained.

The coating layer is determined by observing the above cross-section.

In the resin composition (and the resin molded article thereof) according to the exemplary embodiment, for example, the compatibilizer is configured to be partially compatible with the coating layer and the thermoplastic resin.

Figure 2:
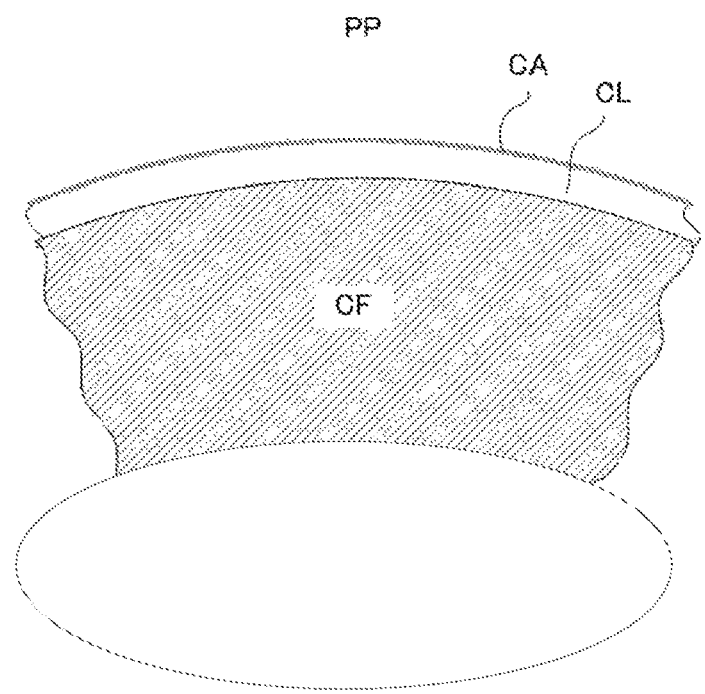
FIG. 2 is a schematic diagram for describing an example of the major parts of the resin molded article according to the exemplary embodiment.

Specifically, for example, a layer of the compatibilizer may be interposed between the coating layer of the polyamide and the thermoplastic resin as the matrix (refer to FIG. 2). That is, the layer of the compatibilizer is formed on the surface of the coating layer, and the coating layer and the thermoplastic resin may be adjacent to each other via the layer of the compatibilizer. Although the layer of the compatibilizer is formed to be thinner than the coating layer, the adhesion (bonding property) between the coating layer and the thermoplastic resin is enhanced by the interposition of the layer of the compatibilizer, and the resin molded article superior in mechanical strength, particularly bending elastic modulus, is easily obtained. In FIG. 2, PP represents the thermoplastic resin, CF represents the carbon fiber, CL represents the coating layer, and CA represents the layer of the compatibilizer.

In particular, the layer of the compatibilizer is bonded to the coating layer (hydrogen bond, covalent bond by reaction of the functional group between the compatibilizer and the polyamide, and the like), and the thermoplastic resin may be interposed between the coating layer and the thermoplastic resin in a state of being compatible with the thermoplastic resin. This configuration is easily achieved, for example, when the compatibilizer has the same structure as or compatible structure with the thermoplastic resin as the matrix, and the compatibilizer containing a site reactive with a functional group of the above-described polyamide is applied to a part of the molecule.

Specifically, for example, in a case where a polyolefin thermoplastic resin, polyamide, and a compatibilizer for maleic anhydride modified polyolefin are applied, in the layer of the maleic anhydride modified polyolefin (layer of compatibilizer), the carboxy group formed by ring-opened of the maleic anhydride site reacts with and binds to the amine residue of the polyamide layer (coating layer), and the polyolefin site thereof may be interposed in a state of being compatible with the polyolefin.

Here, a method for checking that the layer of the compatibilizer is interposed between the coating layer and the thermoplastic resin is as follows.

As an analyzer, a microscopic infrared spectroscopic analyzer (manufactured by JASCO Cooperation, IRT-5200) is used. For example, a sliced piece is cut out from the resin molded article including polypropylene (hereinafter referred to as PP) as the thermoplastic resin, PA 66 having a high presence ratio of the terminal carboxy groups as a specific resin, and maleic acid-modified polypropylene (hereinafter referred to as MA-PP) as a modified polyolefin, and a cross-section thereof is observed. IR mapping of the coating layer around the cross-section of the carbon fiber is performed to confirm maleic anhydride (1820 $cm^{-1}$ to 1750 $cm^{-1}$) derived from the coating layer-compatibilized layer. As a result, it may be confirmed that the layer of the compatibilizer (binding layer) is interposed between the coating layer and the thermoplastic resin.

Hereinafter, the details of each component of the resin composition according to the exemplary embodiment will be described.

Thermoplastic Resin (A)

The thermoplastic resin is the matrix of the resin composition and a resin component which is reinforced by the carbon fiber (also referred to as "matrix resin").

The thermoplastic resin is not particularly limited, and examples thereof include polyolefin (PO), polyphenylene sulfide (PPS), polyamide (PA), polyimide (PI), polyamide imide (PAI), polyether imide (PEI), polyether ether ketone (PEEK), polyether sulfone (PES), polyphenyl sulfone (PPSU), polysulfone (PSF), polyethylene terephthalate (PET), polybutylene terephthalate (PBT), polyacetal (POM), polycarbonate (PC), polyvinylidene fluoride (PVDF), acrylonitrile-butadiene-styrene copolymers (ABS), and acrylonitrile styrene (AS).

One type of thermoplastic resin may be used alone, or two or more types may be used in combination.

Among these, polyolefin (PO) is preferable from the viewpoints of further improving bending elastic modulus and reducing the cost.

Polyolefin is a resin containing a repeating unit derived from an olefin and may contain another repeating unit derived from a monomer other than olefin as long as polyolefin is 30% by weight or less with respect to the total weight of the resin.

Polyolefin is obtained by addition polymerization of olefin (optionally, the monomer other than olefin).

In addition, regarding each of the olefin and the monomer other than olefin for obtaining polyolefin, one type may be used alone, or two or more types may be used in combination.

The polyolefin may be a copolymer or a homopolymer. In addition, the polyolefin may be linear or branched.

Examples of the olefin described herein include linear or branched aliphatic olefins and alicyclic olefins.

Examples of the aliphatic olefins include α-olefins such as ethylene, propylene, 1-butene, 1-hexene, 4-methyl-1-pentene, 1-octene, 1-decene, 1-hexadecene, and 1-octadecene.

In addition, examples of the alicyclic olefins include cyclopentene, cycloheptene, norbornene, 5-methyl-2-norbornene, tetracyclododecene, and vinylcyclohexane.

Among these, from the viewpoint of reducing the cost, α-olefin is preferable, ethylene or propylene is more preferable, and propylene is still more preferable.

In addition, the monomer other than olefin is selected from well-known addition-polymerizable compounds.

Examples of the addition-polymerizable compounds include: styrenes such as styrene, methylstyrene, α-methylstyrene, β-methylstyrene, t-butylstyrene, chlorostyrene, chloromethylstyrene, methoxystyrene, styrenesulfonic acid, and salts thereof; (meth) acrylates such as alkyl (meth) acrylate, benzyl (meth)acrylate, and dimethylaminoethyl (meth)acrylate; halovinyls such as vinyl chloride; vinyl esters such as vinyl acetate and vinyl propionate; vinyl ethers such as vinyl methyl ether; vinylidene halides such as vinylidene chloride; and N-vinyl compounds such as N-vinylpyrrolidone.

Preferable examples of polyolefin include polypropylene (PP), polyethylene (PE), polybutene, polyisobutylene, coumarone-indene resin, terpene resin, ethylene-vinyl acetate copolymer resin (EVA), and the like.

Among these, the resin containing only the repeating unit derived from olefin is preferable. In particular, from the viewpoint of reducing the cost, polypropylene is preferable.

The molecular weight of the thermoplastic resin is not particularly limited, and may be determined according to the type of resin, molding conditions, and the use of the resin molded article. For example, when the thermoplastic resin is the polyolefin, the weight average molecular weight (Mw) thereof is preferably in a range of 10,000 to 300,000 and more preferably in a range of 10,000 to 200,000.

As in the case of the molecular weight, the glass transition temperature (Tg) or melting point (Tm) of the thermoplastic resin is not particularly limited, and may be determined according to the type of the resin, molding conditions, and the use of the resin molded article. For example, when the thermoplastic resin is polyolefin, the melting point (Tm) thereof is preferably in a range of 100° C. to 300° C., and more preferably in a range of 150° C. to 250° C.

The weight average molecular weight (Mw) and melting point (Tm) of polyolefin are a value measured using the following method.

That is, the weight average molecular weight (Mw) of polyolefin is measured by gel permeation chromatography (GPC) under the following conditions. As a GPC system, a high-temperature GPC system "HLC-8321 GPC/HT" is used. As an eluent, o-dichlorobenzene is used. Polyolefin is dissolved in o-dichlorobenzene at a high temperature (140° C. to 150° C.), and the solution is filtered to obtain the filtrate as a measurement sample. The measurement is performed using an RI detector under the following measurement conditions of sample concentration: 0.5%, flow rate: 0.6 ml/min, and sample injection amount: 10 μl. In addition, a calibration curve is prepared from 10 samples, "Polystyrene Standard Sample TSK Standard": "A-500", "F-1", "F-10", "F-80", "F-380", "A-2500", "F-4", "F-40", "F-128", and "F-700" (manufactured by Tosoh Corporation).

In addition, the melting point (Tm) of polyolefin is calculated from the DSC curve obtained from differential scanning calorimetry (DSC) according to a "melting peak temperature" described in a method of calculating melting temperature in "Testing methods for transition temperatures of plastics" of JIS K7121-1987.

The content of the thermoplastic resin as the matrix may be determined according to, for example, the use of the resin molded article. For example, the content of the thermoplastic resin is preferably from 5% by weight to 95% by weight, more preferably from 10% by weight to 95% by weight, and still more preferably from 20% by weight to 95% by weight with respect to the total weight of the resin composition.

In a case where the polyolefin is used as the thermoplastic resin, the content of polyolefin is preferably 20% by weight or higher with respect to the total weight of the thermoplastic resin.

Carbon Fiber

As the carbon fiber, a well-known carbon fiber is used, and any one of a PAN carbon fiber and a pitch carbon fiber is used.

The carbon fiber may undergo a well-known surface treatment.

Examples of the surface treatment for the carbon fiber include an oxidation treatment and a sizing treatment.

The form of the carbon fiber is not particularly limited, and may be selected according to the use of the resin molded article. Examples of the form of the carbon fiber include a fiber bundle including a large number of single fibers, a bundled fiber bundle, and a woven fabric in which fibers are two-dimensionally or three-dimensionally woven.

The fiber diameter, the fiber length, and the like of the carbon fiber are not particularly limited, and may be selected according to the use of the resin molded article.

Here, even if the fiber length of the carbon fiber is short, since the resin molded article superior in mechanical strength, particularly bending elastic modulus may be obtained, the average fiber length of the carbon fibers may be from 0.1 mm or about 0.1 mm to 5.0 mm or about 5.0 mm (preferably from 0.2 mm to 2.0 mm).

In addition, the average diameter of the carbon fibers may be, for example, from 5.0 $\mu$m to 10.0 $\mu$m (preferably from 6.0 $\mu$m to 8.0 $\mu$m).

Here, the measurement method of the average fiber length of the carbon fibers is as follows. The carbon fiber is observed with an optical microscope at a magnification of 100 times to measure the length of the carbon fiber. The measurement is performed for 200 carbon fibers, and the average value thereof is taken as the average fiber length of the carbon fibers.

On the other hand, the measurement method of the average diameter of carbon fibers is as follows. A cross-section perpendicular to the longitudinal direction of the carbon fiber is observed with a scanning electron microscope (SEM) at a magnification of 1,000 times to measure the diameter of the carbon fiber. The measurement is performed for 100 carbon fibers, and the average value thereof is taken as the average diameter of the carbon fibers.

When the fiber length of the carbon fiber is shortened, the resin reinforcing capacity of the carbon fiber tends to deteriorate. In particular, due to recent demands for recycling, it is also promoted to pulverize and recycle the resin molded article reinforced with the carbon fiber, and the fiber length of the carbon fiber is shortened during pulverizing the resin molded article. In addition, the fiber length of the carbon fiber is short during heat molten-kneading when preparing the resin composition in some cases. Therefore, when the resin molded article is molded from the resin composition containing the carbon fiber whose fiber length is shortened, the mechanical strength, particularly the bending elastic modulus, tends to be deteriorated.

However, even when the resin molded article containing the carbon fiber is pulverized, recycled product in which the carbon fiber is converted to the short fiber is used as a raw material, or the carbon fiber is converted to the short fiber during heat molten-kneading, the resin composition according to the exemplary embodiment is useful because the resin molded article superior in mechanical strength, particularly bending elastic modulus may be obtained.

As the carbon fiber, a commercially available product may be used.

Examples of a commercially available product of the PAN carbon fiber include "TORAYCA" (registered trade name; manufactured by Toray Industries Inc.), "TENAX" (manufactured by Toho Tenax Co., Ltd.), and "PYROFIL" (registered trade name; manufactured by Mitsubishi Rayon Co., Ltd.). Other examples of a commercially available product of the PAN carbon fiber include commercially available products manufactured by Hexcel Corporation, Cytec Industries Inc., Dow-Aksa, Formosa Plastics Group, and SGL Carbon Japan Co., Ltd.

Examples of a commercially available product of the pitch carbon fiber include "DYAD" (registered trade name; manufactured by Mitsubishi Rayon Co., Ltd.), "GRANOC" (manufactured by Nippon Graphite Fiber Co., Ltd.), and "KUREKA" (manufactured by Kureha Corporation). Other examples of a commercially available product of the pitch carbon fiber include commercially available products manufactured by Osaka Gas Chemical Co., Ltd., and Cytec Industries Inc.

One type of carbon fiber may be used alone, or two or more types may be used in combination.

The content of the carbon fiber is preferably from 0.1 parts or about 0.1 parts by weight to 200 parts or about 200 parts by weight, more preferably from 1 part by weight to 180 parts by weight, and still more preferably from 5 parts by weight to 150 parts by weight with respect to 100 parts by weight of the thermoplastic resin.

By adjusting the content of the carbon fiber to be 0.1 parts by weight or more with respect to 100 parts by weight of the thermoplastic resin, the resin composition is reinforced. In addition, by adjusting the content of the carbon fiber to be 200 parts or about 200 parts by weight or less with respect to 100 parts by weight of the thermoplastic resin, the moldability during the preparation of the resin molded article is superior.

In a case where the reinforcing fiber other than the carbon fiber is used, the carbon fiber may be used in an amount of 80% by weight or higher with respect to the total weight of the reinforcing fiber.

Hereinafter, the content (part(s) by weight) with respect to 100 parts by weight of the thermoplastic resin will be abbreviated as "phr (per hundred resin)" in some cases.

In a case where this abbreviation is used, the content of the carbon fiber is from 0.1 phr to 200 phr.

Polyamide

The polyamide contains a specific partial structure and is a resin that may coat around the carbon fiber as described above. In addition, the polyamide has at least one of a carboxy group and an amino group at the terminal, and has a higher ratio of the terminal carboxy group than that of the terminal amino group (hereinafter, simply referred to as "presence ratio of the terminal carboxy group is high").

The polyamide will be described in detail.

The polyamide may be a resin having a low compatibility with the thermoplastic resin, and specifically, a resin having a solubility parameter (SP value) different from the solubility parameter of the thermoplastic resin.

Here, the difference between the SP value of the thermoplastic resin and the SP value of the polyamide may be 3 or more and more preferably from 3 to 6 from the viewpoints of compatibility therebetween and repulsion therebetween.

The SP value is a value calculated according to Fedor's method. Specifically, the solubility parameter (SP value)

may be calculated, for example, using the following expression according to the description of Polym. Eng. Sci., vol. 14, p. 147 (1974).

$$\text{SP Value}=\sqrt{(Ev/v)}=\sqrt{(\Sigma\Delta ei/\Sigma\Delta vi)} \qquad \text{Expression: 5}$$

(Here, Ev: evaporation energy (cal/mol), v: molar volume (cm$^3$/mol), $\Delta$ei: evaporation energy of each of atoms or an atomic group, $\Delta$Avi: molar volume of each of atoms or an atomic group)

(cal/cm$^3$)$^{1/2}$ is adopted for the unit of the solubility parameter (SP values). However, the unit will be omitted in accordance with customs, and the SP values will be represented in a dimensionless form.

In addition, the polyamide contains an amide bond in the molecules thereof.

By containing the amide bond, the polyamide exhibits affinity to a polar group present on a surface of the carbon fiber.

Since the presence ratio of the terminal carboxy group of the polyamide is high, the fluidity of the resin composition when heated is enhanced.

For example, in the case where the polyamide is a mixture of two or more types having different concentrations of the terminal carboxy group, the presence ratio of the carboxy group in the polyamide as the total of the polyamides may be high.

Here, the fluidity of the resin composition is evaluated by measuring the MFR of the resin composition. The MFR of the resin composition is measured under the conditions that a temperature is 270° C. and a load is 2.16 kg according to JIS K 7210-1 (2014). That is, MFR is a numerical value representing the fluidity at the time of resin melting, and is obtained by measuring the amount of a resin extruded per 10 minutes through a die having a prescribed diameter set at the bottom of a cylinder in which the resin is melted under the above conditions (temperature and load).

From the viewpoint of improving the fluidity of the resin composition, the presence ratio of the terminal carboxy group of the polyamide may satisfy the following conditions as a ratio of the terminal carboxy group concentration based on the total of the terminal amino group concentration and the terminal carboxy group concentration.

$$0.5<[B]/([A]+[B])\leq 1.0$$

[A]: concentration of the terminal amino group concentration per 1 kg of the polyamide (mol/kg)

[B]: concentration of the terminal carboxy group concentration per 1 kg of the polyamide (mol/kg)

In addition, from the viewpoint of further improving the fluidity of the resin composition, it is preferable to satisfy the condition $0.6\leq[B]/([A]+[B])\leq 1.0$, and it is more preferable to satisfy the condition $0.7\leq[B]/([A]+[B])\leq 1.0$.

The concentration of the carboxy group present at the terminal (terminal carboxy group concentration) of the polyamide may be, for example, 0.01 (mol/kg) or more and 0.50 (mol/kg) or less (preferably 0.02 (mol/kg) or more and 0.40 (mol/kg) or less).

The terminal amino group concentration and the terminal carboxy group concentration of the polyamide are measured as follows.

After dissolving the resin in an N-methyl-2-pyrrolidone solvent, the terminal amino group concentration (mol/kg) causes an excess amount of trifluoroacetic anhydride to act on the terminal amino group together with a triethylamine catalyst. After removing the resin by reprecipitation, the amount of fluorine atom present in the resin is determined by F-NMR, the amount of terminal amino group is calculated, and the terminal amino group concentration is determined.

After dissolving the resin in an N-methyl-2-pyrrolidone solvent, the terminal carboxy group concentration (mol/kg) causes an excess amount of trifluoroethanol and di-t-butyl carbodiimide to act on the terminal carboxy group together with a pyridine catalyst. After removing the resin by reprecipitation, the amount of fluorine atom present in the resin is determined by F-NMR, the amount of terminal carboxy group is calculated, and the terminal carboxy group concentration is determined.

[B]/([A]+[B]) is calculated from the values of the obtained terminal amino group concentration and terminal carboxy group concentration.

In a case where two or more types of the polyamide are used in combination, the ratio of the terminal amino group concentration based on the total of the terminal amino group concentration and the terminal carboxy group concentration per 1 kg of the combined polyamide is determined.

Examples of the polyamide having high presence ratio of the terminal carboxy group include a polyamide obtained by co-polycondensing a dicarboxylic acid and a diamine, a polyamide obtained by condensing a dicarboxylic acid and a lactam, and a polyamide obtained by condensing a dicarboxylic acid, a diamine, and a lactam. That is, the polyamide, a polyamide having at least one of a structural unit in which a dicarboxylic acid and a diamine are condensation-polymerized, and a structural unit in which a lactam is ring-opened may be exemplified.

A polyamide having a high presence ratio of the terminal carboxy group may be obtained, for example, by performing condensation reaction using a dicarboxylic acid component in an excess amount relative to other components for synthesizing a polyamide. For example, the dicarboxylic acid component may be used in such an amount that the ratio of the terminal carboxy group concentration based on the total of the terminal amino group concentration and the terminal carboxy group concentration per 1 kg of the polyamide is a target value.

The polyamide may be a polyamide having a structural unit in which a dicarboxylic acid and a diamine are condensation-polymerized, a polyamide having a structural unit in which lactam is ring-opened, and either a structural unit containing an aromatic ring excluding aramid or a structural unit not containing the aromatic ring, or a polyamide having a structural unit containing the aromatic ring excluding an aramid structural unit and a structural unit not containing the aromatic ring, as long as the presence ratio of the terminal carboxy group is higher. From the viewpoint of the bending elastic modulus, the polyamide may be a polyamide having the structural unit containing the aromatic ring excluding the aramid structural unit and the structural unit not containing the aromatic ring.

In particular, when the polyamide having the structural unit containing the aromatic ring excluding the aramid structural unit and the structural unit not containing the aromatic ring is applied as the polyamide having a high presence ratio of the terminal carboxy group, the affinity between the carbon fiber and the thermoplastic resin is improved. Here, polyamide having only the structural unit containing the aromatic ring tends to have higher affinity with the carbon fiber and lower affinity with the thermoplastic resin than polyamide having only the structural unit not containing the aromatic ring. The polyamide having only the structural unit not containing the aromatic ring tends to have the lower affinity with the carbon fiber and the higher affinity with the thermoplastic resin than the polyamide having only the structural unit containing the aromatic ring. Therefore, by applying the polyamide having both structural units, the affinity with both of the carbon fiber and the thermoplastic resin is improved, and the adhesion at the interface between the carbon fiber and the thermoplastic resin is further enhanced by the coating layer of the polyamide. Therefore, it is easy to obtain the resin molded article superior in mechanical strength, particularly bending elastic modulus.

In addition, when the polyamide having the structural unit containing the aromatic ring excluding the aramid structural unit and the structural unit not containing the aromatic ring is used as the polyamide having a high presence ratio of the terminal carboxy group, the melt viscosity deteriorates and the moldability (for example, injection moldability) also improves. Therefore, the resin molded article having high appearance quality is easily obtained.

When polyamide having only aramid structural unit is applied as the above polyamide, thermal degradation of the thermoplastic resin is caused at high temperatures at which the polyamide may melt. In addition, at a temperature at which thermal degradation of the thermoplastic resin is caused, the polyamide may not be sufficiently melted, the moldability (for example, injection moldability) is deteriorated, and the appearance quality and the mechanical performance of the obtained resin molded article are deteriorated.

The aromatic ring means a monocyclic aromatic ring (cyclopentadiene and benzene) having 5-membered or more rings, and a condensed ring (naphthalene, and the like) condensed with plural monocyclic aromatic rings having 5-membered or more rings. The aromatic ring also includes a heterocyclic ring (pyridine, and the like).

In addition, "aramid structural unit" refers to a structural unit obtained by polycondensation reaction between dicarboxylic acid containing the aromatic ring and diamine containing the aromatic ring.

Here, examples of the structural unit containing an aromatic ring excluding the aramid structural unit include at least one of the following structural units (1) and (2).

Structural Unit (1): —(—NH—Ar$^1$—NH—CO—R$^1$—CO—)—

(In the structural unit (1), Ar$^1$ represents a divalent organic group containing an aromatic ring. R$^1$ represents a divalent organic group not containing the aromatic ring.)

Structural Unit (2): —(—NH—R$^2$—NH—CO—Ar$^2$—CO—)—

(In the structural unit (2), Ar$^2$ represents a divalent organic group containing the aromatic ring. R$^2$ represents a divalent organic group not containing the aromatic ring.)

On the other hand, examples of the structural unit not containing an aromatic ring include at least one of the following structural units (3) and (4).

Structural Unit (3): —(—NH—R$^{31}$—NH—CO—R$^{32}$—O—)—

(In the structural unit (3), R$^{31}$ represents a divalent organic group not containing the aromatic ring. R$^{32}$ represents a divalent organic group not containing the aromatic ring.)

Structural Unit (4): —(—NH—R$^4$—CO—)—

(In the structural unit (4), R$^4$ represents a divalent organic group not containing the aromatic ring.)

In formulas (1) to (3), the "divalent organic group" represented by each symbol is an organic group derived from a divalent organic group possessed by dicarboxylic acid, diamine, or lactam. Specifically, for example, in the structural unit (1), "divalent organic group containing the aromatic ring" represented by Ar$^1$ represents a residue obtained by removing two amino groups from diamine, and "divalent organic group not containing the aromatic ring" represented by R$^1$ represents a residue obtained by removing two carboxy groups from dicarboxylic acid. In addition, for example, in the structural unit (4), "divalent organic group not containing the aromatic ring" represented by R$^4$ is an organic group interposed between "NH group" and "CO group" when the lactam is ring-opened.

As the polyamide, any of a copolymerized polyamide and a mixed polyamide may be used as long as the presence ratio of the terminal carboxy group is high. As the polyamide, the copolymerized polyamide and the mixed polyamide may be used in combination. Among these, the mixed polyamide is preferable as the polyamide from the viewpoint of further improving the mechanical strength, particularly bending elastic modulus.

In the aromatic polyamide, the ratio of the structural unit containing an aromatic ring is preferably 80% by weight or more (preferably 90% by weight or more, and more preferably 100% by weight or more) based on the whole structural units.

On the other hand, in the aliphatic polyamide, the ratio of the structural unit not containing the aromatic ring is preferably 80% by weight or more (preferably 90% by weight or more, and more preferably 100% by weight or more) based on the whole structural units.

Examples of the aromatic polyamide include a condensation polymer of dicarboxylic acid containing the aromatic ring and diamine not containing the aromatic ring, and a condensation polymer of dicarboxylic acid not containing the aromatic ring and diamine containing the aromatic ring.

Examples of the aliphatic polyamide include a condensation polymer of dicarboxylic acid not containing the aromatic ring and diamine not containing the aromatic ring, and the like. A ring-opened polycondensate of lactam not containing the aromatic ring, and the like may be included.

Here, examples of the dicarboxylic acid containing the aromatic ring include phthalic acid (terephthalic acid, isophthalic acid, and the like), biphenyldicarboxylic acid, and the like.

Examples of the dicarboxylic acid not containing the aromatic ring include oxalic acid, adipic acid, suberic acid, sebacic acid, 1,4-cyclohexanedicarboxylic acid, malonic acid, succinic acid, glutaric acid, pimelic acid, azelaic acid, and the like.

Examples of the diamine containing the aromatic ring include p-phenylenediamine, m-phenylenediamine, m-xylenediamine, diaminodiphenylmethane, diaminodiphenyl ether, and the like.

Examples of the diamine not containing the aromatic ring include ethylenediamine, pentamethylenediamine, hexamethylenediamine, nonanediamine, decamethylenediamine, 1,4-cyclohexanediamine, and the like.

Examples of the lactam not containing the aromatic ring include ε-caprolactam, undecane lactam, lauryl lactam, and the like.

Each dicarboxylic acid, each diamine, and each lactam may be used alone or two or more types may be used in combination.

As the aromatic polyamide, for example, a polyamide having a skeleton such as MXD 6 (condensation polymer of adipic acid and metaxylene diamine), nylon 6T (condensation polymer of terephthalic acid and hexamethylenediamine), nylon 6I (polycondensate of isophthalic acid and hexamethylenediamine), nylon 9T (polycondensate of terephthalic acid and nonanediamine), and nylon M5T (polycondensate of terephthalic acid and methylpentadiamine), and having a high presence ratio of the terminal carboxy groups present at the terminal of these polyamides is included.

As the aliphatic polyamide, for example, a polyamide having a skeleton such as nylon 6 (ring-opened polycondensate of ε-caprolactam), nylon 11 (ring-opened polycondensate of undecane lactam), nylon 12 (ring-opened polycondensate of lauryllactam), nylon 66 (condensation polymer of adipic acid and hexamethylenediamine), and nylon 610 (condensation polymer of sebacic acid and hexamethylenediamine), and having a high presence ratio of the terminal carboxy groups present at the terminal of these polyamides is included.

Physical properties of the polyamide will be described.

The molecular weight of the polyamide is not particularly limited, and the molecular weight may be as long as the polyamide is likely to be thermally melted than the thermoplastic resin coexisting in the resin composition. For example, the weight average molecular weight of the polyamide is preferably in the range of 10,000 to 300,000, and more preferably in the range of 10,000 to 100,000.

In addition, a glass transition temperature or a melting temperature (melting point) of the polyamide is not particularly limited, similar to the above molecular weight, and the temperature may be as long as the polyamide is likely to be thermally melted than the thermoplastic resin coexisting in the resin composition. For example, the melting point (Tm) of polyamide (each polyamide of copolymerized polyamide and mixed polyamide) is preferably in the range of 100° C. to 400° C., and more preferably in the range of 150° C. to 350° C.

From the viewpoint of further improving the mechanical strength, particularly bending elastic modulus, the content of the polyamide is preferably 0.1 parts by weight or more and 100 parts by weight or less, more preferably 0.5 parts by weight or more and 90 parts by weight or less, and further preferably 1 part by weight or more and 80 parts by weight or less based on 100 parts by weight of the thermoplastic resin.

When the content of the polyamide is within the above range, the affinity with the carbon fiber is enhanced and the mechanical strength, particularly the bending elastic modulus is improved.

In particular, when the polyamide is included in a large amount in a range of exceeding 20 parts by weight and 100 parts by weight or less based on 100 parts by weight of the thermoplastic resin, the amount of the compatibilizer becomes relatively small to the amount of the polyamide, the polyamide becomes difficult to spread in the thermoplastic resin, and the tendency to localize around the carbon fibers is enhanced. As a result, it is considered that the coating layer of polyamide is formed in a state close to uniformity while thickening to some extent over the entire circumference of the carbon fiber having a short fiber length. Therefore, the adhesion of the interface between the carbon fiber and the thermoplastic resin is enhanced, and a resin molded article superior in mechanical strength, particularly bending elastic modulus, is likely to be obtained.

From the viewpoint of effectively exhibiting the affinity with the carbon fiber, the content of the polyamide may be proportional to the content of the carbon fiber described above.

The content of the polyamide based on the weight of the carbon fiber is preferably 0.1% or about 0.1% by weight or more and 200% or about 200% by weight or less, more preferably 1% by weight or more and 150% by weight or less, and further preferably 1% by weight or more and 120% by weight or less.

When the content of the polyamide based on the weight of the carbon fiber is 0.1% by weight or more, the affinity between the carbon fiber and the polyamide is likely to be increased, and when the content is 200% by weight or less, the resin flowability is improved.

Compatibilizer

The compatibilizer is a resin that enhances the affinity between the thermoplastic resin and the polyamide.

The compatibilizer may be determined according to the thermoplastic resin.

The compatibilizer may have the same structure as the thermoplastic resin and contains a portion having affinity to the polyamide in a part of the molecules.

For example, in a case where polyolefin is used as the thermoplastic resin, modified polyolefin may be used as the compatibilizer.

Here, when the thermoplastic resin is polypropylene (PP), modified polypropylene (PP) is preferable as the modified polyolefin. Likewise, when the thermoplastic resin is an ethylene-vinyl acetate copolymer resin (EVA), a modified ethylene-vinyl acetate copolymer resin (EVA) is preferable as the modified polyolefin.

Examples of the modified polyolefin include polyolefins into which a modification site containing a carboxy group, a carboxylic anhydride residue, a carboxylate residue, an imino group, an amino group, an epoxy group, or the like is introduced.

From the viewpoints of further improving the affinity between the polyolefin and the polyamide and considering the upper limit temperature during molding, the modification site to be introduced into the polyolefin preferably contains a carboxylic anhydride residue, and in particular, more preferably contains a maleic anhydride residue.

The modified polyolefin may be obtained using, for example, a method of causing a compound containing the above-described modification site to react with polyolefin such that the modification site is directly chemically bonded to polyolefin or a method of forming a graft chain using a compound containing the above-described modification site and bonding the graft chain to polyolefin.

Examples of the compound containing the above-described modification site include maleic anhydride, fumaric anhydride, citric anhydride, N-phenylmaleimide, N-cyclohexylmaleimide, glycidyl (meth)acrylate, glycidyl vinylbenzoate, N-[4-(2,3-epoxypropoxy)-3,5-dimethylbenzyl]acrylamide, alkyl (meth)acrylate, and derivatives thereof.

In particular, modified polyolefin obtained by causing a reaction between maleic anhydride as an unsaturated carboxylic acid to react with polyolefin is preferable.

Specific examples of the modified polyolefin include acid-modified polyolefins such as maleic anhydride-modified polypropylene, maleic anhydride-modified polyethylene, a maleic anhydride-modified ethylene-vinyl acetate copolymer resin (EVA), and adducts or copolymers thereof.

As the modified polyolefin, a commercially available product may be used.

Examples of the modified propylene include YOUMEX (registered trade name) series (100TS, 110TS, 1001, 1010) manufactured by Sanyo Chemical Industries, Ltd.

Examples of the modified polyethylene include YOUMEX (registered trade name) series (2000) manufactured by Sanyo Chemical Industries, Ltd. and MODIC (registered trade name) series manufactured by Mitsubishi Chemical Corporation.

The molecular weight of the compatibilizer is not particularly limited and, from the viewpoint of workability, is preferably from 5,000 to 100,000 and more preferably 5,000 to 80,000.

The content of the compatibilizer is preferably from 0.1 parts by weight to 50 parts by weight, more preferably from 0.1 parts by weight to 40 parts by weight, and still more preferably from 0.1 parts by weight to 30 parts by weight with respect to 100 parts by weight of the thermoplastic resin.

The content of the compatibilizer is preferably from 1 part or about 1 part by weight to 50 parts or about 50 parts by weight, more preferably from 5 parts by weight to 50 parts by weight, and still more preferably from 10 parts by weight to 50 parts by weight with respect to 100 parts by weight of the polyamide.

By adjusting the content of the compatibilizer to be within the above-described range, the affinity between the thermoplastic resin and the polyamide is enhanced, and the mechanical strength, particularly the bending elastic modulus may be improved.

From the viewpoint of enhancing the affinity between the thermoplastic resin and the polyamide, it is preferable that the content of the compatibilizer may be proportional to the content of the polyamide (is indirectly proportional to the content of the carbon fiber).

The content of the compatibilizer is preferably from 1% by weight to 50% by weight, more preferably from 1% by weight to 40% by weight, and still more preferably from 1% by weight to 30% by weight with respect to the weight of the carbon fiber.

When the content of the compatibilizer is 1% by weight or higher with respect to the weight of the carbon fiber, the affinity between the carbon fiber and the polyamide is likely to be obtained. When the content of the compatibilizer is 50% by weight or lower (in particular, 30% by weight or lower), the remaining of an unreacted functional group caused by discoloration or deterioration is prevented.

Other Components

The resin composition according to the exemplary embodiment may contain other components in addition to the above-described components.

Examples of the other components include well-known additives such as a flame retardant, a flame retardant auxiliary agent, a dripping inhibitor during heating, a plasticizer, an antioxidant, a release agent, a light resistant agent, a weather resistant agent, a colorant, a pigment, a modifier, an antistatic agent, a hydrolysis inhibitor, a filler, and a reinforcing agent other than the carbon fiber (for example, talc, clay, mica, glass flake, milled glass, glass beads, crystalline silica, alumina, silicon nitride, aluminum nitride, or boron nitride).

The content of the other components is preferably from 0 part by weight to 10 parts by weight and more preferably from 0 part by weight to 5 parts by weight with respect to 100 parts by weight of the thermoplastic resin. Here, "0 part by weight" represents that the resin composition does not contain other components.

Method of Preparing Resin Composition

The resin composition according to the exemplary embodiment is prepared by molten-kneading the respective components.

Here, a well-known unit is used as a molten-kneading unit, and examples thereof include a twin-screw extruder, a HENSCHEL MIXER, a BUNBURY MIXER, a single-screw extruder, a multi-screw extruder, and a co-kneader.

The temperature (cylinder temperature) during molten-kneading may be determined according to, for example, the melting point of the resin components constituting the resin composition.

In particular, the resin composition according to the exemplary embodiment may be obtained using a preparing method including molten-kneading the thermoplastic resin, the carbon fiber, the polyamide, and the compatibilizer. When the thermoplastic resin, the carbon fiber, the polyamide, and the compatibilizer are collectively molten-kneaded, the coating layer which is formed around the carbon fiber using the polyamide is likely to be formed in a thin and substantially uniform state, and the mechanical strength, particularly the bending elastic modulus, is enhanced.

Resin Molded Article

The resin molded article according to the exemplary embodiment contains the thermoplastic resin, the carbon fiber, the polyamide, and the compatibilizer. That is, the resin molded article according to the exemplary embodiment has the same composition as the resin composition according to the exemplary embodiment.

The resin molded article according to the exemplary embodiment may be obtained by preparing the resin composition according to the exemplary embodiment and molding the resin composition, or may be obtained by preparing a composition containing components other than the carbon fiber and mixing the composition with the carbon fiber during molding.

Examples of a molding method include injection molding, extrusion molding, blow molding, hot press molding, calendering, coating molding, cast molding, dipping molding, vacuum molding, and transfer molding.

As the molding method of the resin molded article according to the exemplary embodiment, injection molding is preferable from the viewpoint of obtaining a high degree of freedom for the shape.

The cylinder temperature during injection molding is, for example, from 180° C. to 300° C. and preferably from 200° C. to 280° C. The mold temperature during injection molding is, for example, from 30° C. to 100° C. and preferably from 30° C. to 60° C.

The injection molding may be performed using a commercially available machine such as "NEX150" (manufactured by Nissei Plastic Industrial Co., Ltd.), "NEX300" (manufactured by Nissei Plastic Industrial Co., Ltd.), SE50D (manufactured by Sumitomo Machinery Co., Ltd.), and the like.

The resin molded article according to the exemplary embodiment may be used in applications such as electronic and electric apparatuses, business machines, home electronics, automobile interior materials, and containers. Specific examples of the applications include: housings of electronic and electric apparatuses and home electronics; various components of electronic and electric apparatuses and home electronics, automobile interior components; storage cases of CD-ROM, DVD, and the like; tableware; beverage bottles; food trays; wrapping materials; films; and sheets.

In particular, in the resin molded article according to the exemplary embodiment, the carbon fiber is used as the reinforcing fiber, and thus the mechanical strength and, particularly, elastic modulus are further superior. Therefore, the resin molded article according to the exemplary embodiment may be applied as an alternative to a metal component.

EXAMPLES

Hereinafter, the invention will be described in more detail using Examples but is not limited to these examples.

Synthesis Example 1

Synthesis of PA-1

11.27 kg (97 mol) of hexamethylenediamine as a diamine component, 14.61 kg (100 mol) of adipic acid (diamine component/dicarboxylic acid component=0.97 (molar ratio)) as a dicarboxylic acid component, and 10 g of sodium hypophosphite and 18 kg of ion-exchanged water as a catalyst are charged in a 50 liter autoclave. The autoclave is pressurized with $N_2$ from normal pressure to 0.05 MPa, released under pressure, and returned to normal pressure. The operation is performed three times to perform $N_2$ substitution, and thereafter stirring is performed at 135° C. and 0.3 MPa to perform homogeneous dissolution. Thereafter, the solution is continuously supplied by a liquid feed pump, the temperature is raised to 240° C. in a heating pipe, and heat is applied for 1 hour. Thereafter, the reaction mixture is charged in a pressure reaction vessel, heated to 300° C. while maintaining the internal pressure of the vessel at 3 MPa to partially distill away water, thereby obtaining a condensate. Thereafter, the condensate is put into a hot water to be washed, and then frozen with liquid nitrogen and pulverized with a hammer. The obtained resin powder is dried at 120° C. for 12 hours to obtain a polyamide resin PA-1 having an amino group at the terminal.

According to the method described above, when the terminal carboxy group concentration [B] is measured, the concentration is to be 0.27 mol/kg. In addition, when the terminal amino group concentration [A] is measured, [B]/([A]+[B]) is calculated, and the obtained value is 1.0.

Synthesis Example 2

Synthesis of PA-2

Polyamide PA-2 is obtained in the same manner as in Synthesis Example 1 except that the amount of hexamethylenediamine is changed to 11.04 kg (95 mol) (diamine component/dicarboxylic acid component=0.95 (molar ratio)).

According to the method described above, when the terminal carboxy group concentration [B] is measured, the concentration is to be 0.44 mol/kg. In addition, when the terminal amino group concentration [A] is measured, [B]/([A]+[B]) is calculated, and the obtained value is 1.0.

Synthesis Example 3

Synthesis of PA-3

Polyamide PA-3 is obtained in the same manner as in Synthesis Example 1 except that the amount of hexamethylenediamine is changed to 11.51 kg (99 mol) (diamine component/dicarboxylic acid component=0.99 (molar ratio)).

According to the method described above, when the terminal carboxy group concentration [B] is measured, the concentration is to be 0.09 mol/kg. In addition, when the terminal amino group concentration [A] is measured, [B]/([A]+[B]) is calculated, and the obtained value is 1.0.

Synthesis Example 4

Synthesis of PA-4

Polyamide PA-4 is obtained in the same manner as in Synthesis Example 1 except that the amount of hexamethylenediamine is changed to 11.97 kg (103 mol) (diamine component/dicarboxylic acid component=1.03 (molar ratio)).

According to the method described above, when the terminal carboxy group concentration [B] is measured, the concentration is to be 0 mol/kg. In addition, when the terminal amino group concentration [A] is measured, [B]/([A]+[B]) is calculated, and the obtained value is 0.0.

Synthesis Example 5

Synthesis of PA-5

Polyamide PA-5 is obtained in the same manner as in Synthesis Example 1 except that the dicarboxylic acid component is changed to 14.61 kg (100 mol) of adipic acid, and the diamine component is changed to 13.21 kg (97 mol) of metaxylene diamine (diamine component/dicarboxylic acid component=0.97 (molar ratio)).

According to the method described above, when the terminal carboxy group concentration [B] is measured, the concentration is to be 0.24 mol/kg. In addition, when the terminal amino group concentration [A] is measured, [B]/([A]+[B]) is calculated, and the obtained value is 1.0.

Examples 1 to 15 and Comparative Examples 1 to 8

Pellets of a resin composition are obtained by kneading components (numerical values in the table represent the number of parts) shown in Tables 1 and 2 using a twin-screw extruder (TEM58SS, manufactured by Toshiba Machine Co., Ltd.) at a molten-kneading temperature (cylinder temperature) shown in the following kneading conditions and Tables 1 and 2.

Regarding the fluidity of the obtained pellets, the MFR of the resin composition is measured according to the method described above. Furthermore, the moldability of the obtained pellets is evaluated as follows. The measurement results are shown in Tables 1 and 2.

Injection molding is performed out using a mold having a resin injection port at the center part and a helical spiral groove starting from the injection part, and the length of the injected resin is measured.

Spiral shape: width of 5 mm, thickness of 3 mm, and maximum flow length of 750 mm Injection pressure: 100 MPa Injection speed: 50 mm/s Evaluation Criteria A: Spiral flow length of 300 mm or more B: Spiral flow length of 200 mm or more and less than 300 mm C: Spiral flow length of less than 200 mm The obtained pellets are baked at 600° C. for 2 hours, and the average fiber length of the remaining carbon fibers is measured by the method described above. The measurement results are shown in Tables 1 and 2.

Kneading Conditions

Screw diameter: ϕ 58 mm

Rotation speed: 300 rpm

Discharge nozzle diameter: 1 mm

The obtained pellets are molded by an injection molding machine (NEX150, manufactured by Nissei Plastic Industrial Co., Ltd.) at an injection molding temperature (cylinder temperature) shown in Tables 1 and 2 and a mold temperature of 50° C. to obtain D2 specimens (length of 60 mm, width of 60 mm, thickness of 2 mm).

Presence or Absence of Coating Layer

Using each of the obtained D2 specimens, the presence or absence of the coating layer using the polyamide is determined in accordance with the method described above.

TABLE 1

| | | | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|---|
| Composition | Thermoplastic Resin | Polypropylene | 100 | 100 | 100 | 100 | 100 | 100 | 100 | 100 | 100 | | 100 |
| | | Polyethylene | | | | | | | | | | 100 | |
| | Reinforcing Fiber | Carbon Fiber A (Surface-treated) | 10 | 50 | 100 | 200 | 10 | 200 | 10 | 200 | | 200 | 10 |
| | | Carbon Fiber B (not Surface-treated) | | | | | | | | | 5 | | |
| | Specific Resin | Aliphatic PA | PA-1 | 20 | 60 | 80 | 100 | | | | | 10 | 100 | 15 |
| | | | PA-2 | | | | | 20 | 100 | | | | | |
| | | | PA-4 | | | | | | | | | | | 5 |
| | | | PA-3 | | | | | | | 20 | 100 | | | |
| | | Aromatic PA | PA-5 | | | | | | | | | | | |
| | | Ratio of Carboxy Group [B]/([A] + [B]) | | 1.0 | 1.0 | 1.0 | 1.0 | 1.0 | 1.0 | 1.0 | 1.0 | 1.0 | 0.75 |
| | Compatibilizer | Maleic Anhydride-modified Polypropylene | 5 | 10 | 30 | 50 | 5 | 50 | 5 | 50 | 2 | | 5 |
| | | Maleic Anhydride-modified Polyethylene | | | | | | | | | | 50 | |
| | Total | | 135.0 | 220 | 310 | 450 | 135 | 450 | 135 | 450 | 117 | 450 | 135 |
| Conditions | Molten-kneading Temperature (° C.) | | 260 | 260 | 260 | 260 | 260 | 260 | 260 | 260 | 260 | 260 | 260 |
| | Injection Molding Temperature (° C.) | | 260 | 260 | 260 | 260 | 260 | 260 | 260 | 260 | 260 | 260 | 260 |
| Characteristic | MFR of Resin Composition (g/10 min) | | 18 | 16 | 15 | 14 | 22 | 14 | 20 | 16 | 25 | 16 | 13 |
| | Moldability of Resin Composition | | A | A | A | A | A | A | A | A | A | A | A. |
| | Presence or Absence of Coating Layer | | Presence | Presence | Presence | Presence | Presence | Presence | Presence | Presence | Presence | Presence | Presence |
| | Average Fiber Length (mm) | | 0.7 | 0.7 | 0.7 | 0.7 | 0.7 | 0.7 | 0.7 | 0.7 | 0.7 | 0.7 | 0.7 |
| | Number of Parts of Carbon Fiber (to 100 Parts of Thermoplastic Resin) | | 10 | 50 | 100 | 200 | 10 | 200 | 10 | 200 | 5 | 200 | 10 |
| | % by Weight of Specific Resin (to 100 Parts of Carbon Fiber) | | 200 | 120 | 80 | 50 | 200 | 50 | 200 | 50 | 200 | 50 | 200 |
| | Number of Parts of Compatibilizer (to 100 Parts of Specific Resin) | | 25 | 16.7 | 38 | 50 | 25 | 50 | 25 | 50 | 20 | 50 | 25 |
| | Amount of Carbon Fiber occupied in Resin Molded Article (%) | | 7.4 | 22.7 | 32.3 | 44.4 | 7.4 | 44.4 | 7.4 | 44.4 | 4.3 | 44.4 | 7.4 |

TABLE 2

| | | | Example 12 | Example 13 | Example 14 | Example 15 | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|---|---|---|---|
| Composition | Thermoplastic Resin | Polypropylene | 100 | 100 | 100 | 100 | 100 | 100 | 100 | 100 | 100 | 100 | 100 | 100 |
| | | Polyethylene | | | | | | | | | | | | |
| | Reinforcing Fiber | Carbon Fiber A (Surface-treated) | 50 | 50 | 50 | 10 | 50 | 10 | 50 | 10 | | | | 25 |
| | | Carbon Fiber B (not Surface-treated) | | | | | | | | | | | | |
| | Specific Resin | Aliphatic PA | PA-1 | | | | | | | | | 10 | 10 | 0.1 | 20 |
| | | | PA-2 | 25 | 48 | 2 | | | | | | | | | |
| | | | PA-4 | | | | | 20 | 20 | 10 | 10 | | | | |
| | | | PA-3 | 25 | 2 | 48 | | | | | | | | | |
| | | Aromatic PA | PA-5 | | | | 20 | | | | | | | | |
| | | Ratio of Carboxy Group [B]/([A] + [B]) | | 1.0 | 1.0 | 1.0 | 1.0 | 0 | 0 | 0.5 | 0.5 | | | | |

TABLE 2-continued

|  |  | Example | Example 12 | Example 13 | Example 14 | Example 15 | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|---|---|---|---|
|  | Compatibilizer | Maleic Anhydride-modified Polypropylene | 25 | 25 | 25 | 5 | 0.1 | 15 | 0.1 | 0.1 |  | 0.1 | 20 |  |
|  |  | Maleic Anhydride-modified Polyethylene |  |  |  |  |  |  |  |  |  |  |  |  |
|  |  | Total | 225 | 225 | 225 | 135 | 170.1 | 145 | 170.1 | 130.1 | 100 | 100.2 | 140 | 125 |
| Conditions | Molten-kneading Temperature (° C.) |  | 260 | 260 | 260 | 260 | 260 | 260 | 260 | 260 | 220 | 260 | 260 | 220 |
|  | Injection Molding Temperature (° C.) |  | 260 | 260 | 260 | 260 | 260 | 260 | 260 | 260 | 220 | 260 | 260 | 220 |
| Characteristic | MFR of Resin Composition (g/10 min) |  | 16 | 18 | 14 | 19 | 4 | 6 | 10 | 12 | 16 | 16 | 14 | 8 |
|  | Moldability of Resin Composition |  | A | A | A | A | C | C | C | C | B | B | C | C |
|  | Presence or Absence of Coating Layer |  | Presence | Presence | Presence | Presence | Presence | Presence | Presence | Presence | Absence | Absence | Absence | Absence |
|  | Average Fiber Length (mm) |  | 0.7 | 0.7 | 0.7 | 0.7 | 0.7 | 0.7 | 0.7 | 0.7 | 0.7 | 0.7 | 0.7 | 0.7 |
|  | Number of Parts of Carbon Fiber (to 100 Parts of Thermoplastic Resin) |  | 50 | 50 | 50 | 10 | 50 | 10 | 50 | 10 | 0 | 0 | 0 | 25 |
|  | % by Weight of Specific Resin (to 100 Parts of Carbon Fiber) |  | 100 | 100 | 100 | 200 | 40 | 200 |  |  |  |  |  | 0 |
|  | Number of Parts of Compatibilizer (to 100 Parts of Specific Resin) |  | 50 | 50 | 50 | 25 | 0.5 | 75 | 0.5 | 0.5 |  | 100 | 100 |  |
|  | Amount of Carbon Fiber occupied in Resin Molded Article (%) |  | 22.2 | 22.2 | 22.2 | 7.4 | 29.4 | 6.9 |  |  | 0.0 | 0.0 | 0.0 | 20.0 |

The details of materials shown in Tables 1 and 2 are as follows.

Thermoplastic Resin
Polypropylene (NOVATEC (registered trade name) PPMA3, manufactured by Japan Polypropylene Corporation)
Polyethylene (ULTZEX 20100J, manufactured by Prime Polymer Co., Ltd.)
Reinforcing Fiber
Carbon fiber A (surface-treated, chopped carbon fiber TORAYCA (registered trade name), Toray Industries Inc., average fiber length 20 mm, average diameter: 7 μm)
Carbon fiber B (not surface-treated, obtained after immersing the above chopped carbon fiber TORAYCA (registered trade name), Toray Industries Inc., in a solvent to remove a sizing agent)
Aliphatic PA (Aliphatic Polyamide)
PA-1 (PA-1 synthesized above)
PA-2 (PA-2 synthesized above)
PA-3 (PA-3 synthesized above)
PA-4 (PA-4 synthesized above)
Aromatic PA (Aromatic Polyamide)
PA-5 (PA-5 synthesized above)
Compatibilizer
Maleic anhydride-modified polypropylene (YOUMEX (registered trade name) 110TS, manufactured by Sanyo Chemical Industries, Ltd.)
Maleic anhydride-modified polyethylene (MODIC M142 manufactured by Mitsubishi Chemical Corporation)

From the above results, it is understood that a resin composition superior in fluidity and moldability may be obtained in Examples as compared to Comparative Examples.

When the molded articles prepared in each Example are analyzed by the method described above, it is confirmed that a layer of the compatibilizer used (layer of maleic anhydride modified polypropylene, layer of maleic anhydride modified polyethylene, and layer of maleic anhydride modified ethylene or vinyl acetate copolymer resin (EVA)) is interposed between the coating layer and the thermoplastic resin (layer of the compatibilizer is formed on the surface of the coating layer).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A resin composition comprising:
a thermoplastic resin;
a carbon fiber;
a polyamide having at least one of a carboxy group and an amino group at a terminal thereof, in which a presence ratio of the carboxy group present on the terminal (terminal carboxy group) is higher than a presence ratio of the amino group present on the terminal (terminal amino group); and a compatibilizer, wherein a difference in value between a solubility parameter of the polyamide and a solubility parameter of the thermoplastic resin is 3 or more.

2. The resin composition according to claim 1, wherein a relationship between the presence ratio of the terminal amino group and the presence ratio of the terminal carboxy group per 1 kg of the polyamide satisfies the following formula:

$$0.6 \leq [B]/([A]+[B]) \leq 1.0$$

wherein [A] represents a concentration of the terminal amino group (mol/kg) which is a molar amount of the terminal amino group per 1 kg of the polyamide, and [B] represents a concentration of the terminal carboxy group (mol/kg) which is a molar amount of the terminal carboxy group per 1 kg of the polyamide.

3. The resin composition according to claim 1, wherein the thermoplastic resin is a polyolefin.

4. The resin composition according to claim 1, wherein the compatibilizer is a modified polyolefin.

5. The resin composition according to claim 1, wherein an average fiber length of the carbon fibers is from about 0.1 mm to about 5.0 mm.

6. The resin composition according to claim 1, wherein a content of the carbon fiber is from about 0.1 parts by weight to about 200 parts by weight with respect to 100 parts by weight of the thermoplastic resin.

7. The resin composition according to claim 1, wherein a content of the compatibilizer is from about 1 parts by weight to about 50 parts by weight with respect to 100 parts by weight of the polyamide.

8. The resin composition according to claim 1, wherein a content of the polyamide is from about 0.1% by weight to about 200% by weight with respect to a weight of the carbon fiber.

9. A resin molded article comprising:
a thermoplastic resin;
a carbon fiber;
a polyamide having at least one of a carboxy group and an amino group at a terminal thereof, in which a presence ratio of the carboxy group present on the terminal (terminal carboxy group) is higher than a presence ratio of the amino group present on the terminal (terminal amino group); and
a compatibilizer,
wherein a difference in value between a solubility parameter of the polyamide and a solubility parameter of the thermoplastic resin is 3 or more.

10. The resin molded article according to claim 9, wherein a relationship between the presence ratio of the terminal amino group and the presence ratio of the terminal carboxy group per 1 kg of the polyamide satisfies the following formula:

$$0.6 \leq [B]/([A]+[B]) \leq 1.0$$

wherein [A] represents a concentration of the terminal amino group (mol/kg) which is a molar amount of the terminal amino group per 1 kg of the polyamide, and [B] represents a concentration of the terminal carboxy group (mol/kg) which is a molar amount of the terminal carboxy group per 1 kg of the polyamide.

11. The resin molded article according to claim 9, wherein the thermoplastic resin is a polyolefin.

12. The resin molded article according to claim 9, wherein the compatibilizer is a modified polyolefin.

13. The resin molded article according to claim 9, wherein an average fiber length of the carbon fibers is from about 0.1 mm to about 5.0 mm.

14. The resin molded article according to claim 9, wherein a content of the carbon fiber is from about 0.1 parts by weight to about 200 parts by weight with respect to 100 parts by weight of the thermoplastic resin.

15. The resin molded article according to claim 9, wherein a content of the compatibilizer is from about 1 part by weight to about 50 parts by weight with respect to 100 parts by weight of the polyamide.

16. The resin molded article according to claim 9, wherein a content of the polyamide is from about 0.1% by weight to about 200% by weight with respect to a weight of the carbon fiber.

17. The resin composition according to claim 1, wherein the polyamide includes both a structural unit containing an aromatic ring excluding aramid and a structural unit not containing an aromatic ring.

18. The resin molded article according to claim 9, wherein the resin molded article has a structure in which the carbon fiber is disposed in the thermoplastic resin, the polyamide coats a surface of the carbon fiber, and the compatibilizer is interposed between the polyamide and the thermoplastic resin.

* * * * *